United States Patent
Clark et al.

[15] 3,651,583
[45] Mar. 28, 1972

[54] TRAINER AIRCRAFT
[72] Inventors: Kenneth William Clark, Filton; Reginald Frank Hopton, Fishponds, both of England
[73] Assignee: Rolls-Royce Limited, Derby, England
[22] Filed: Apr. 24, 1970
[21] Appl. No.: 31,720

[52] U.S. Cl. ..............................................35/12 B, 244/84
[51] Int. Cl. .........................................B64g 7/00, G09b 9/08
[58] Field of Search ....................35/12 A, 12 B, 12 S, 12 W, 35/12 T; 244/84, 83 D

[56] References Cited

UNITED STATES PATENTS 2,216,489  10/1940  Fox .........................................35/12 R
3,063,160  11/1962  Hemstreet ..............................35/12 S

*Primary Examiner*—Robert W. Michell
*Assistant Examiner*—L. R. Oremland
*Attorney*—Mawhinney & Mawhinney

[57] ABSTRACT

A trainer aircraft having an actual engine and means for simulating one-sided power loss in a pair of imaginary engines situated at opposite sides of the aircraft. Two throttle control levers are connected to feed to the actual engine a signal proportionate to the sum of the lever settings while a signal proportionate to difference of the lever settings in fed to a means for imparting a yawing moment on the aircraft, so that if one of the levers is retracted while the other remains advanced the effect will be as if one of the imaginary engines has suffered a power loss while the other remains at power.

3 Claims, 5 Drawing Figures

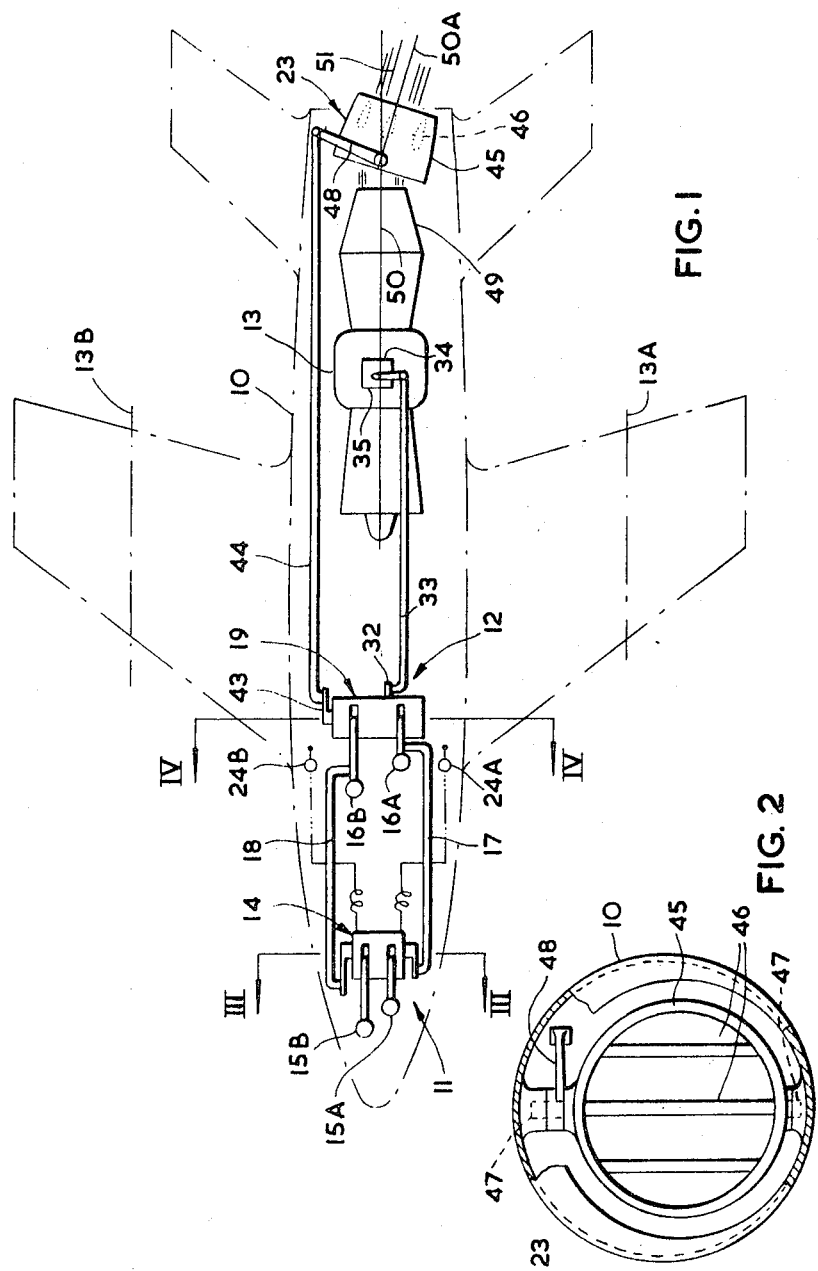

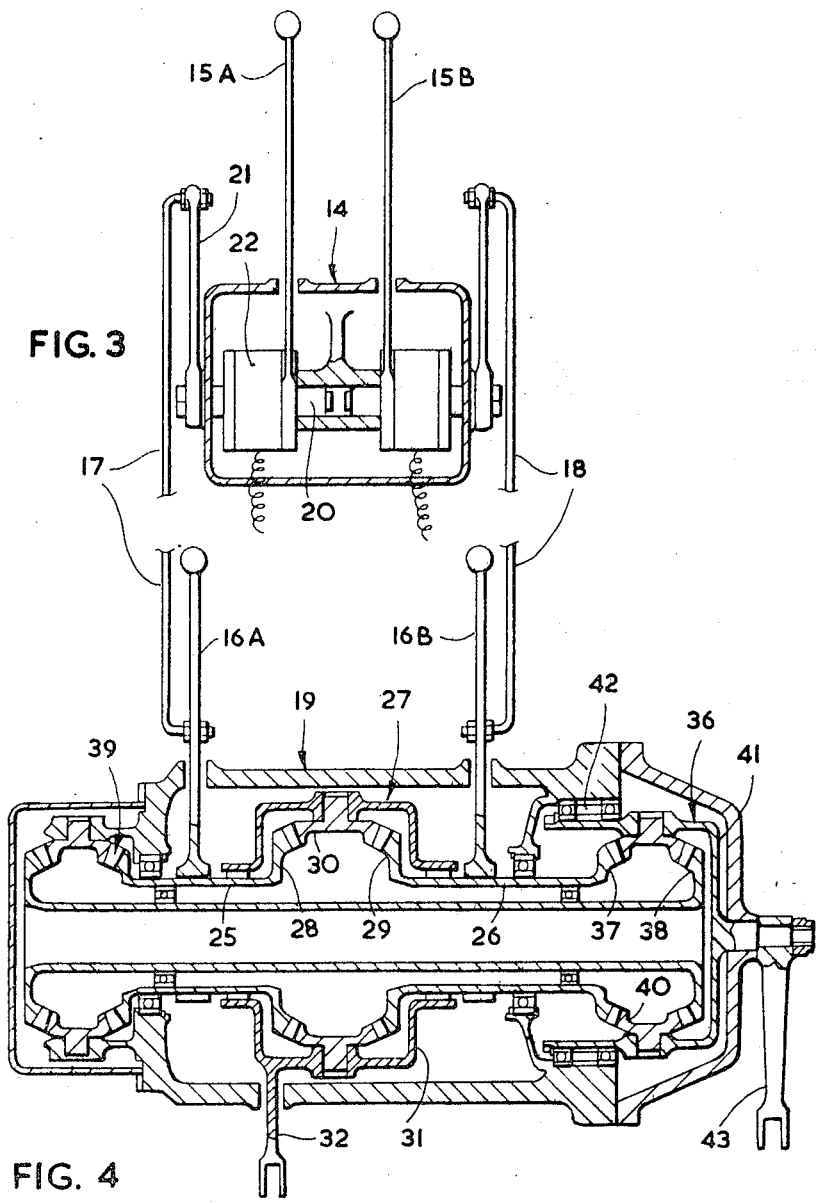

TRAINER AIRCRAFT

This invention relates to trainer aircraft.

During the training of pilots for aircraft having engines at opposite sides of the plane of symmetry of the aircraft, the student has to learn how to cope with the situation when there is a one-sided loss of power. In conventional trainer aircraft, having the necessary number of engines, such a situation can be simulated readily by the instructor reducing the fuel flow to the engine assumed to have failed.

In an aircraft having a single engine situated in the plane of symmetry of the aircraft it has hitherto not been possible to give training for one-sided loss of power. Likewise in an aircraft having, say, one engine at each side of the plane of symmetry, it has hitherto not been possible to give training for loss of power in respect of engines whose spanwise position is different from that of the existing engines or in respect of engines additional to the existing engines. The object of this invention is to overcome this difficulty with a view to utilizing trainer aircraft not having the conventionally required power plant configuration.

According to this invention there is provided an aircraft having at least one propulsion engine, characterized by the provision of two independently movable control members connected to produce a signal proportional to the sum of their respective movements and further connected to produce a signal proportional to the difference of their respective movements, the sum signal being connected to operate a means for varying the power of said at least one engine, and the difference signal being connected to operate a means for imparting a yawing moment to the aircraft, so that if the control members are set unequally the resulting power and yaw magnitudes simulate a corresponding power difference in a pair of imaginary engines disposed at the respective sides of the aircraft.

An example of an aircraft according to this invention will now be described with reference to the accompanying drawings wherein:

FIG. 1 is a plan view of the aircraft.

FIG. 2 is a rear end view of the aircraft shown at an enlarged scale.

FIG. 3 is an enlarged section on the line III—III in FIG. 1

FIG. 4 is an enlarged section on the line IV—IV in FIG. 1.

Figure 5:
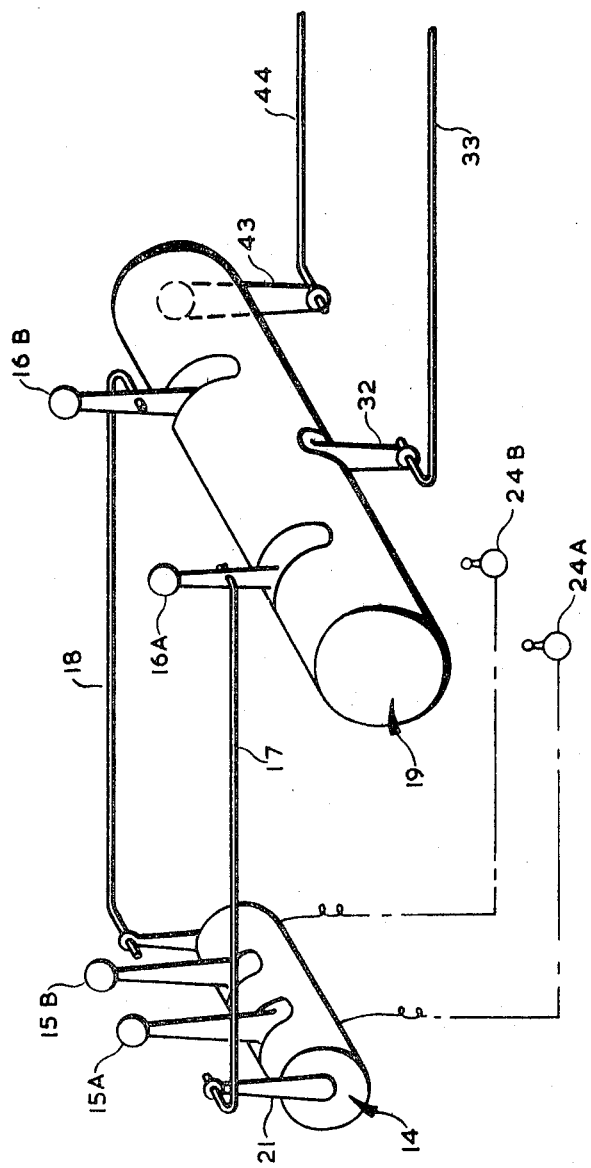
FIG. 5 is a perspective view of details of FIG. 1.

Referring to FIG. 1 there is shown an aircraft 10 having a students control position 11, and instructor's control position 12 and a single centrally mounted propulsion unit 13 which is a gas turbine engine.

At the position 11 there is provided a control unit 14 including two control levers 15A,15B connected by rods 17,18 to two corresponding levers 16A,16B of a control unit 23 at the position 12.

The levers 16A,16B are connected to vary the fuel flow to the engine 13 and are further connected to a thrust diverter 23 with the effect that if one of the levers is set differently from the other it will be as if different amounts of fuel were supplied to two imaginary engines 13A, 13B provided respectively at the port and starboard sides of the aircraft.

The lever 15A is secured to a shaft 20 (FIG. 3) connected to a lever 21 through an electromagnetic clutch 22, the rod 17 being connected to the lever 21. The clutch 22 is normally in the engaged condition and can be disengaged by a switch 24A at the instructor's position 12. A similar arrangement is made for the lever 15B, the corresponding clutch being disengageable by a switch 24B. By operation of the switches 24A or 24B the instructor can deprive the student of control by one or other of the levers 15A,15B.

The levers 16A,16B are secured respectively to shafts 25,26 connected to a summing differential 27 comprising an input gear 28 connected to the shaft 25, an input gear 29 connected to the shaft 26 and, output gears 30 supported on a carrier 31 supported for rotation on the shafts 25,26 and being integral with a lever 32. The arrangement is such that movement of the lever 32 is the mean of angular movements of the levers 16A,16B.

The lever 32 is connected by a rod 33 to a lever 34 for actuating a valve 35 in the fuel supply (not shown) to the engine 13. The connection between the levers 16A,16B and the lever 34 is made such that maximum fuel flow to the engine can be established only if both levers 16A,16B are moved together by the fullest possible amount. This represents the condition of full power in both of the imaginary engines 13A,13B. If one of the levers is moved by a lesser amount than the other, then the fuel flow will be the mean of the two lever positions, so that if one of the levers 16A,16B is moved to its zero position, the fuel flow to the engine 13 is halved and represents complete loss of power in one of the imaginary engines 13A or 13B.

The shafts 25,26 are also connected to a differencing differential 36 comprising an input gear 37 connected directly to the shaft 26, an input gear 38 connected to the shaft 25 through a reversing gearing 39, and output gears 40 supported on a carrier 41 supported for rotation by bearings 42 and secured to a lever 43. The arrangement is such that angular movement of the lever 43 is the difference between movements of the levers 16A,16B.

The lever 43 is connected by a rod 44 to the thrust diverter 23. The diverter 23 comprises an annular shroud 45 within which are secured vertical vanes 46. The shroud is supported on the aircraft structure by trunnions 47 for pivotal motion about a vertical axis. This pivotal motion is effected by a movement of the rod 44 through the intermediary of a lever 48 secured to the shroud and connected to the rod. The engine 13 has a jet nozzle 49 whose axis 50 lies in the plane of symmetry of the aircraft, and the shroud is so connected to the levers 16A,16B that if these levers are in identical angular positions the shroud is in a neutral position in which it is coaxial with the nozzle 49 but if, as shown in FIG. 1, the positions of the levers 16A,16B differ, then the shroud is moved away from its neutral position. It will be seen that the jet 51, of the engine has to pass through the shroud and between the vanes 46. In the neutral position of the shroud the vanes have no significant effect, but when the shroud is moved away from the neutral position the direction of the jet is correspondingly diverted by the vanes horizontally away from the axis 50, e.g., in the direction 50A as shown in FIG. 1. When the jet is diverted in this way, the force exerted by the jet on the vanes produces on the aircraft a yaw moment corresponding to the extent of angular displacement of the shroud, i.e., corresponding to the extent of any difference in the angular positions of the levers 16A,16B. The connection between these levers and the shroud is made such that if, for example, the lever 16A is moved by a lesser amount than the lever 16B, the shroud is pivoted to direct the jet to the port side of the aircraft. This causes a yaw to port and simulates the condition in which the imaginary starboard engine 13B exerts greater thrust than the engine 13A.

During training the student normally has control by means of the levers 15A, 15B. If the instructor wishes to simulate a one-sided engine failure, he disconnects one of the levers 15A or 15B and sets the corresponding lever 16A or 16B to zero. The student then experiences a condition corresponding to loss of power in one of the imaginary engines and he has to operate the aircraft controls, e.g., the rudder, to maintain the balance of the aircraft. Depending on flight conditions, he may also have to increase the setting of the remaining effective lever 15A or 15B to obtain more power. To this end the movement of levers 15A,15B may normally be restricted to a position at which only a part of the maximum engine thrust is obtainable. Following a simulated engine failure the remaining effective lever can then be moved beyond the restricted position to provide emergency power.

In this way training for loss of thrust in a twin-engined aircraft can be given in a single-engined aircraft.

The movement of the rod 33 defines a signal proportionate to the sum of the movements of the levers 16A,16B. The movement of the rod 44 defines a signal proportionate to the difference of these movements. The example described shows mechanical means for producing these signals. However, any equivalent electrical or hydraulic means may be used.

Further, the invention is applicable to any type of power plant. If a propeller power plant is used the means for imparting a yawing moment to the aircraft may be a rudder or wind brakes adapted to provide this yawing moment in response to the difference signal. In the case of a gas turbine engine the yawing moment can be provided by any known means for deflecting the jet of the engine.

Apart from being applicable to simulation of a one-side failure in propulsion plant, the invention is also applicable to one-sided failure in a braking apparatus, for example a thrust reverser in the case of jet propelled aircraft. To simulate a one-sided thrust reverser failure, the aircraft is flown by the student with the engine throttled back, and the instructor disconnects one of the levers 15A or 15B and moves the appropriate lever 16A or 16B to full power. The student then experiences the yaw moment and a power recovery occuring in the case of a reverser failure.

What we claim is:

1. An aircraft having at least one propulsion engine, two independently movable control members, representing respectively control members of imaginary port and starboard engines, means responsive to the respective movements of the control members to produce a signal proportionate to the sum of said movements, means responsive to said movements to produce a signal proportionate to the difference of said movements, means responsive to the sum signal to increase the power of said at least one engine when the signal increases and vice versa, and means responsive to the difference signal to impart to the aircraft a yaw moment corresponding to excursion of the difference signal from zero, the direction of the yaw moment being such that it represents a power difference in the imaginary engines corresponding to the position difference of the control members.

2. An aircraft according to claim 1, comprising two further control members respectively connected to the first-mentioned control members, and means for rendering inoperative the connection between each said further control member and its associated first-mentioned control member.

3. An aircraft according to claim 1, said at least one engine being a jet propulsion and the means to impart a yawing moment being constituted by a means for diverting the jet of the engine in a horizontal plane.

* * * * *